(12) United States Patent
Olofsson

(10) Patent No.: US 6,681,820 B2
(45) Date of Patent: Jan. 27, 2004

(54) PROCESS FOR THE MANUFACTURING OF JOINING PROFILES

(75) Inventor: Ola Olofsson, Trelleborg (SE)

(73) Assignee: Pergo (Europe) AB, Trelleborg (SE)

( * ) Notice: Subject to any disclaimer, the term of this patent is extended or adjusted under 35 U.S.C. 154(b) by 46 days.

(21) Appl. No.: 10/058,968

(22) Filed: Jan. 30, 2002

(65) Prior Publication Data

US 2003/0140478 A1 Jul. 31, 2003

(30) Foreign Application Priority Data

Jan. 31, 2001 (SE) .......................... 0100276-5

(51) Int. Cl.[7] .............................. B27C 9/00; E04B 2/08; B27D 1/00; B27K 1/00; B23Q 16/00

(52) U.S. Cl. .......................... 144/368; 144/3.1; 144/38; 144/91; 144/91.2; 144/134.1; 144/136.1; 144/347; 144/364; 144/402; 144/412; 144/356; 29/558; 29/564; 409/136; 409/148; 409/244; 409/245; 427/408; 427/440; 52/586.1; 52/589.1

(58) Field of Search .............................. 52/586.1, 589.1, 52/592.1; 29/33 R, 557, 558, 564; 144/1.1, 3.1, 38, 91, 91.2, 82, 134.1, 136.1, 356, 360, 364, 382, 367, 368, 369, 402, 412, 347; 409/136, 148, 244, 245; 427/408, 290, 291, 440; 428/106, 537.1

(56) References Cited

U.S. PATENT DOCUMENTS

| 752,694 | A | | 2/1904 | Lund |
| 2,004,193 | A | | 6/1935 | Cherry |
| 3,535,844 | A | | 10/1970 | Glaros |
| 3,664,011 | A | * | 5/1972 | Labastrov ............... 144/347 X |
| 3,807,113 | A | | 4/1974 | Turner |
| 4,426,820 | A | | 1/1984 | Terbrack et al. |
| 4,940,503 | A | | 7/1990 | Lindgren et al. |
| 5,165,816 | A | | 11/1992 | Parasin |
| 5,216,861 | A | | 6/1993 | Meyerson |
| 5,295,341 | A | | 3/1994 | Kajiwara |
| 5,325,649 | A | | 7/1994 | Kajiwara |
| 5,344,700 | A | | 9/1994 | McGath et al. |
| 5,502,939 | A | | 4/1996 | Zadok et al. |
| 5,630,304 | A | | 5/1997 | Austin |
| 5,706,621 | A | | 1/1998 | Pervan |
| 5,860,267 | A | | 1/1999 | Pervan |
| 6,006,486 | A | | 12/1999 | Moriau et al. |
| 6,023,907 | A | | 2/2000 | Pervan |
| 6,094,882 | A | | 8/2000 | Pervan |
| 6,182,410 | B1 | | 2/2001 | Pervan |
| 6,205,639 | B1 | | 3/2001 | Pervan |
| 6,490,836 | B1 | | 12/2002 | Moriau et al. |

FOREIGN PATENT DOCUMENTS

| BE | 557844 | 3/1960 |
| CA | 1169106 | 6/1984 |
| DE | 3343601 | 6/1985 |
| GB | 812671 | 4/1959 |
| GB | 1430423 | 3/1976 |
| GB | 2256023 | 11/1992 |
| JP | 3169967 | 7/1991 |
| SE | 518203 | 9/2002 |
| SU | 123409 | 6/1986 |
| WO | 9627721 | 9/1996 |
| WO | 9747834 | 12/1997 |

* cited by examiner

Primary Examiner—W. Donald Bray
(74) Attorney, Agent, or Firm—Stevens, Davis, Miller & Mosher, L.L.P.

(57) ABSTRACT

A process for the manufacturing of longitudinal profiles such and tongue and groove on boards wherein the process includes the steps;

a) Moulding a substantial part of the profile cross-section by means of milling with a milling tool.

b) Fine moulding undercuts in at least the groove of the board by means of broaching utilising at least one broaching tool.

20 Claims, 3 Drawing Sheets

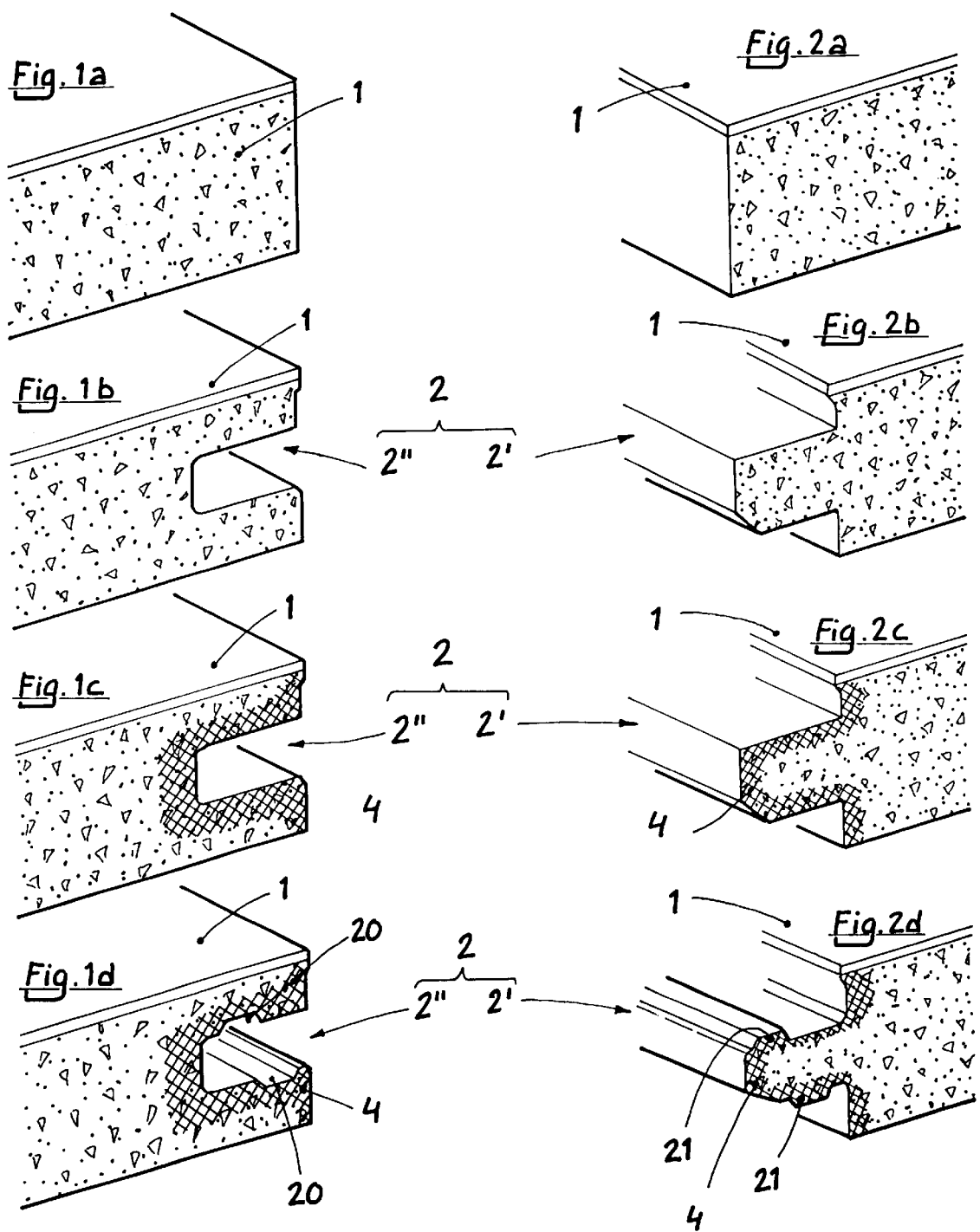

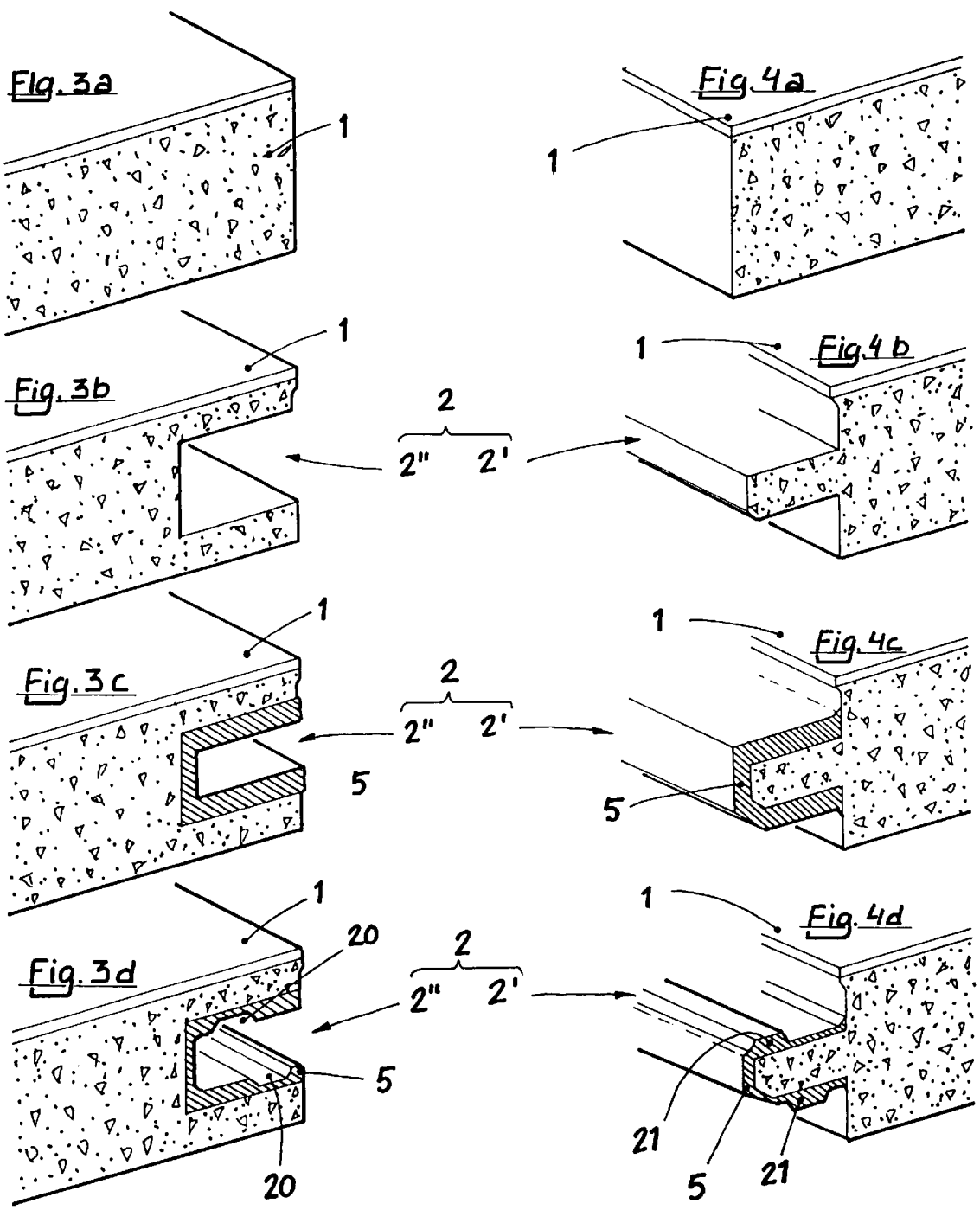

PROCESS FOR THE MANUFACTURING OF JOINING PROFILES

This application claims priority under 35 USC §119 from Swedish Patent Application No. 0100276-5, filed Jan. 31, 2001.

BACKGROUND OF THE INVENTION

Field of the Invention

Different kinds of boards and other flat elements which are joined to each other by means of tongue and groove are well known. Tongue and groove are nowadays normally made by milling which is a rational method. It is however difficult to achieve complex cross-sections with undercuts with traditional milling, especially in narrow grooves. It is known to achieve undercuts to some degree by utilising more than one milling tool with different rotation axis. The problem with this method is however that it is very difficult to obtain desirable tolerances due to vibrations and flexing in the machine since there must be some distance between the different milling tools. The cross-section possible to manufacture by this method is also limited since the milling tool will have to rotate through the opening of for example a groove. It is desirable to achieve a process where the tolerance play is good, undercuts with sharper angles are possible to manufacture and where dust and particles form the milling isn't obstructing the process.

SUMMARY OF THE INVENTION

It has, according to the process of the present invention, been made possible to achieve profiles such as tongue and groove on boards, with better tolerances, undercuts with sharper angles and without having dust and particles from the milling process obstructing the process.

Accordingly, the invention relates to a process for the manufacturing of longitudinal profiles such and tongue and groove on boards wherein the process includes the steps;

a) Moulding a substantial part of the profile cross-section by means of milling with a milling tool.

b) Fine moulding undercuts in at least the groove of the board by means of broaching utilising at least one broaching tool.

The milling tool is adjustably fixed in a conveying machine, which machine feeds the boards past the milling tool during the milling operation. The broaching tool is preferably adjustably fixed in the same conveying machine, which machine feeds the board past the broaching tool. The process is most suitably used for machining tongue and groove on thin boards such as floor boards. The tongue and groove may, through the process, be provided with a functionality which allows them to snap join. Accordingly, the moulding of the profiles is initiated by milling a substantial part of the material to be removed with a traditional milling tool. The final shape of the profiles are then achieved by broaching. The undercuts are also achieved in the broaching stage of the process.

If materials like fibre board or particle board are used it is known that burrs often occur which will obstruct the functionality in the tighter parts of a snap joint. This can be avoided by adding the step of coating of the milled profile section before the broaching stage where the fine moulding takes place. The coating suitably comprises a substance such as wax, oil, a polymeric material being exemplified by a thermoplastic polyolefin and a lacquer being exemplified by a UV-curing lacquer.

The broaching tool preferably comprises broaching edges, a broaching body and a broaching clamp. The broaching body is suitably provided with internal cooling channels for a cooling media, the cooling media being selected from the group consisting of a gas and a liquid. The broaching body is suitably also provided with a temperature sensor used for guiding the cooling. The temperature sensor is either an infrared sensor directed towards one or more broaching edges or a conductive sensor attached to the broaching body. The broaching tool is suitably provided with at least one nozzle for blowing air on the broaching edges. The air blown on the broaching edges may serve two purposes the first one being to remove dust and particles from the cutting edges the second one being to cool the broaching tool. It is possible to use the blown air as either a complement to, or a replacement for the internal cooling. The broaching tool is suitably also provided with an air and dust evacuation duct which evacuates dust and particles from the broaching edges. The air blown on the edges may suitably also pulsate for better cleaning of the edges.

The front edge portions of the broaching edges are suitably concave in order to increase the stability during the cutting operation and at the same time ensure secure removal of the waste material so that no or very little burr is formed. The side edge portions of the broaching edges are suitably also concave in order to increase the stability during the cutting operation and at the same time ensure secure removal of the waste material so that no or very little burr is formed.

BRIEF DESCRIPTION OF THE DRAWINGS

The invention is described further in connection to the enclosed drawings showing different embodiments of the invention whereby, FIGS. 1a–1d shows, in a cross-section perspective view, a longitudinal profile 2 in the form of a groove 2" in an edge of a board 1 at different steps in the process according to one embodiment of the invention.

FIGS. 2a–2d shows, in a cross-section perspective view, a longitudinal profile 2 in the form of a tongue 2' in an edge of a board 1 at different steps in the process according to one embodiment of the invention.

FIGS. 3a–3d shows, in a cross-section perspective view, a longitudinal profile 2 in the form of a groove 2" in an edge of a board 1 at different steps in the process according to a second embodiment of the invention.

FIGS. 4a–4d shows, in a cross-section perspective view, a longitudinal profile 2 in the form of a tongue 2' in an edge of a board 1 at different steps in the process according to a second embodiment of the invention.

DETAILED DESCRIPTION OF THE PREFERRED EMBODIMENTS

Figure 5:
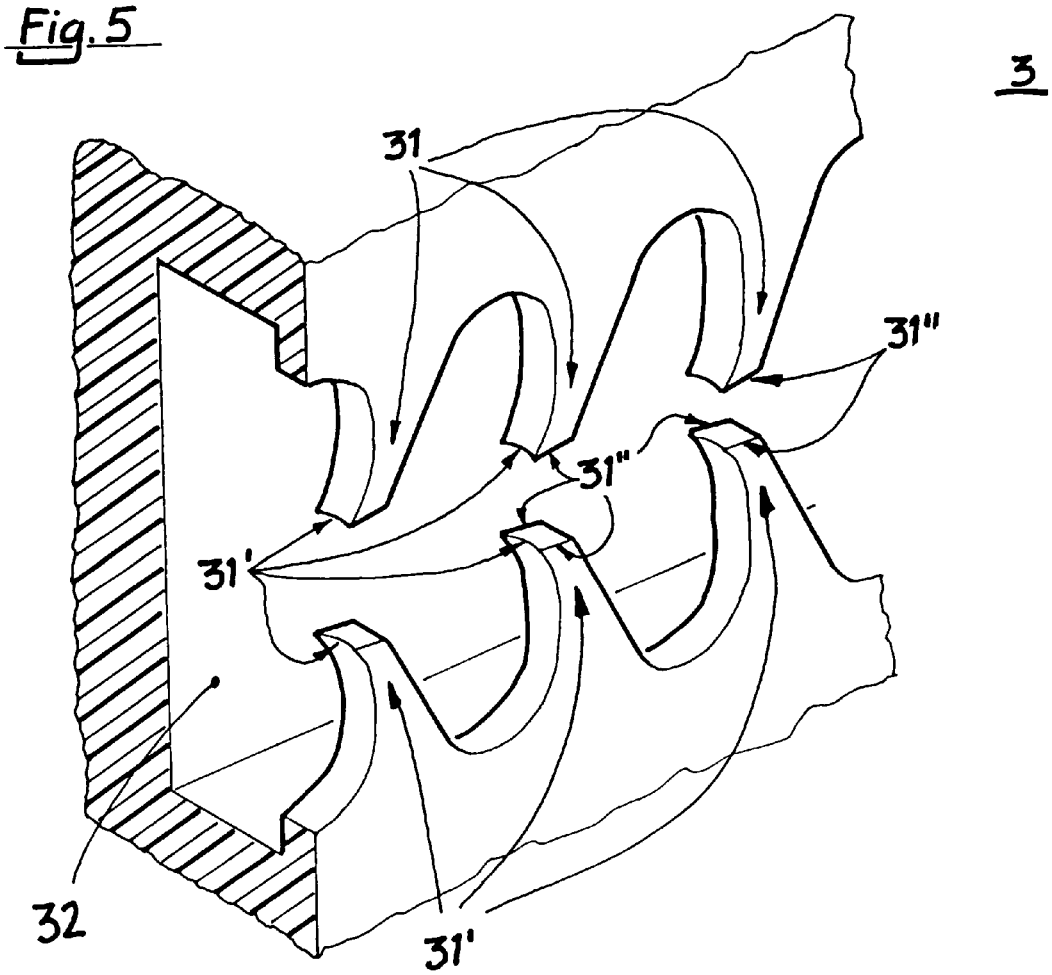
FIG. 5 shows, in cross-section perspective view, a broaching tool 3 for fine moulding undercuts 20 in a tongue 2'.

Accordingly FIGS. 1a–1d shows, in a cross-section perspective view, a longitudinal profile 2 in the form of a groove 2" in an edge of a board 1 at different steps in the process according to one embodiment of the invention. The drawing is simplified by enlarging certain objects in the cross-section geometry in order to enhance the understanding of the invention. FIG. 1a shows a board 1 with a core and a decorative top layer before the moulding of the longitudinal profile 2. FIG. 1b shows the board 1 after milling of a substantial part of a groove 2". The main part of the material to be removed in the making of the finished groove 2" is here removed by a traditional rotating milling tool. Such a tool is well suited for removing larger quantities of material as the tool itself will convey the material from the groove 2". FIG. 1c shows the board 1 after applying an impregnation 4 on the edge. It is advantageous to apply the impregnation 4 at the stage after milling since the impregnation 4 only will penetrate to a certain distance from the surface. It is possible to utilise several known substances for this impregnation where oil and wax are the most commonly used. FIG. 1d shows the board 1 after the fine moulding by broaching utilising a broaching tool 3 similar to the one shown in FIG. 6. The impregnation applied in the earlier stage of the process will act as a lubricant as well as a bonding agent which will make the surface of the joint smoother and at the same time minimise the risk for forming of burr. The later is a rather common problem, specially in cases where the core of the board 1 is made of fibre board like MDF (medium density fibre board) or HDF (high density fibre board). A smoother and more well defined surface in critical parts of a joint will render the possibility to design the joint with a decreased play. This, in its turn, will render the possibility to make smaller undercuts 20 and hooks 21 with maintained tearing resistance or increasing the tearing resistance by maintaining the dimension of the undercuts 20 and hooks 21. The advantages with broaching is furthermore that it will be possible to manufacture profiles 2 with cross-section geometry impossible to manufacture with traditional milling, as the one performed in earlier stages of the invention.

FIGS. 2a–2d shows, in a cross-section perspective view, a longitudinal profile 2 in the form of a tongue 2' in an edge of a board 1 at different steps in the process according to one embodiment of the invention. The drawing is simplified by enlarging certain objects in the cross-section geometry in order to enhance the understanding of the invention. FIG. 2a shows a board 1 with a core and a decorative top layer before the moulding of the longitudinal profile 2. FIG. 2b shows the board 1 after milling of a substantial part of a tongue 2'. The main part of the material to be removed in the making of the finished tongue 2' is here removed by a traditional rotating milling tool. Such a tool is well suited for removing larger quantities of material as the tool itself will convey the material from the tongue 2'. FIG. 2c shows the board 1 after applying an impregnation 4 on the edge. It is advantageous to apply the impregnation 4 at the stage after milling since the impregnation 4 only will penetrate to a certain distance from the surface. It is possible to utilise several known substances for this impregnation where oil and wax are the most commonly used. FIG. 2d shows the board 1 after the fine moulding by broaching utilising a broaching tool 3 similar to the one shown in FIG. 5. The impregnation applied in the earlier stage of the process will act as a lubricant as well as a bonding agent which will make the surface of the joint smoother and at the same time minimise the risk for forming of burr. The later is a rather common problem, specially in cases where the core of the board 1 is made of fibre board like MDF (medium density fibre board) or HDF (high density fibre board). A smoother and more well defined surface in critical parts of a joint will render the possibility to design the joint with a decreased play. This, in its turn, will render the possibility to make smaller undercuts 20 and hooks 21 with maintained tearing resistance or increasing the tearing resistance by maintaining the dimension of the undercuts 20 and hooks 21. The advantages with broaching is furthermore that it will be possible to manufacture profiles 2 with cross-section geometry impossible to manufacture with traditional milling, as the one performed in earlier stages of the invention.

FIGS. 3a–3d shows, in a cross-section perspective view, a longitudinal profile 2 in the form of a groove 2" in an edge of a board 1 at different steps in the process according to a second embodiment of the invention. The drawing is simplified by enlarging certain objects in the cross-section geometry in order to enhance the understanding of the invention. FIG. 3a shows a board 1 with a core and a decorative top layer before the moulding of the longitudinal profile 2. FIG. 3b shows the board 1 after milling a groove 2". More material than the final shape of the groove 2" is here removed by a traditional rotating milling tool. Such a tool is well suited for removing larger quantities of material as the tool itself will convey the material from the groove 2". FIG. 3c shows the board 1 after applying a polymeric material 5 to the groove 2". The polymeric material 5 may suitably be a thermoplastic material which is molten and applied in the groove 2" in a process which reminds of extrusion. In cases where the board 1 is used as a floor covering material the thickness of the board 1 will be in the range 5–12 mm. The thickness of the polymeric material 5 applied will then have to be in the range 0.6–1.5 mm in order to match the geometry of the joint. A thermoplastic material applied in a molten state will have to be cooled before final steps of the moulding of the joint. This may be achieved by blowing cooled air and/or by pressing a cooling slider of a thermally conductive material towards the joint. The latter may also be used for pre shaping the polymeric material 5 before the final fine moulding. FIG. 3d shows the board 1 after the fine moulding by broaching utilising a broaching tool 3 similar to the one shown in FIG. 6. The polymeric material 5 applied in the earlier stage of the process will make the surface of the joint smoother and at the same time minimise the risk for forming of burr. The later is a rather common problem, specially in cases where the core of the board 1 is made of fibre board like MDF (medium density fibre board) or HDF (high density fibre board). A smoother and more well defined surface in critical parts of a joint will render the possibility to design the joint with a decreased play. This, in its turn, will render the possibility to make smaller undercuts 20 and hooks 21 with maintained tearing resistance or increasing the tearing resistance by maintaining the dimension of the undercuts 20 and hooks 21. The advantages with broaching is furthermore that it will be possible to manufacture profiles 2 with cross-section geometry impossible to manufacture with traditional milling, as the one performed in earlier stages of the invention.

FIGS. 4a–4d shows, in a cross-section perspective view, a longitudinal profile 2 in the form of a tongue 2' in an edge of a board 1 at different steps in the process according to a second embodiment of the invention. The drawing is simplified by enlarging certain objects in the cross-section geometry in order to enhance the understanding of the invention. FIG. 4a shows a board 1 with a core and a decorative top layer before the moulding of the longitudinal profile 2. FIG. 4b shows the board 1 after milling a tongue 2'. More material than the final shape of the tongue 2' is here removed by a traditional rotating milling tool. Such a tool is well suited for removing larger quantities of material as the tool itself will convey the material from the tongue 2'. FIG. 4c shows the board 1 after applying a polymeric material 5 to the tongue 2'. The polymeric material 5 may suitably be a thermoplastic material which is molten and applied on the tongue 2' in a process which reminds of extrusion. In cases where the board 1 is used as a floor covering material the thickness of the board 1 will be in the range 5–12 mm. The thickness of the polymeric material 5 applied will then have to be in the range 0.6–1.5 mm in order to match the geometry of the joint. A thermoplastic material applied in a molten state will have to be cooled before final steps of the moulding of the joint. This may be achieved by blowing cooled air and/or by pressing a cooling slider of a thermally conductive material towards the joint. The latter may also be used for pre shaping the polymeric material 5 before the final fine moulding. FIG. 4*d* shows the board 1 after the fine moulding by broaching utilising a broaching tool 3 similar to the one shown in FIG. 5. The polymeric material 5 applied in the earlier stage of the process will make the surface of the joint smoother and at the same time minimise the risk for forming of burr. The latter is a rather common problem, specially in cases where the core of the board 1 is made of fibre board like MDF (medium density fibre board) or HDF (high density fibre board). A smoother and more well defined surface in critical parts of a joint will render the possibility to design the joint with a decreased play. This, in its turn, will render the possibility to make smaller undercuts 20 and hooks 21 with maintained tearing resistance or increasing the tearing resistance by maintaining the dimension of the undercuts 20 and hooks 21. The advantages with broaching is furthermore that it will be possible to manufacture profiles 2 with cross-section geometry impossible to manufacture with traditional milling, as the one performed in earlier stages of the invention.

FIG. 5 shows, in cross-section perspective view, a broaching tool 3 for fine moulding undercuts 20 in a tongue 2'. The broaching tool 3 shown in FIG. 5 is a simplified version of the broaching tool 3 used to achieve the profile 2 cross-sections shown in FIGS. 2*d* and 4*d* above. The broaching tool 3 is used for fine moulding the tongue 2' so that hooks 21 and a good matching of a groove 2", manufactured according to the present invention, are achieved. The broaching is initiated after having milled a substantial part of the tongue 2' so that most of the material to be removed in order to obtain a tongue 2' as shown in selected embodiments of the invention, is removed by the milling process ensuring a more secure operation in the broaching stage. The broaching tool 3 is adjustably fixed in the conveying machine, which machine feeds the board past the broaching tool 3.

The broaching tool 3 comprises broaching edges 31, a broaching body 32 and a broaching clamp. The broaching body 32 is provided with internal cooling channels for a cooling media. The cooling media may be gas and a liquid. A temperature sensor used for guiding the cooling broaching body 32 is advantageously also used. The manufacturing tolerances will be better if the temperature in the broaching tool 3 is maintained within a selected range. The temperature sensor may be an infrared sensor directed towards one or more broaching edges 31 or a conductive sensor attached to the broaching body 32 itself. It also possible to achieve a narrow temperature range in the broaching tool 3 by controlling the temperature of the cooling media. The broaching tool 3 may also be provided with one or more nozzles blowing air on the broaching edges 31. The air stream is adjusted so that it will cool the broaching edges 31 as well as removing dust and particles from the same. The broaching tool 3 may furthermore be provided with an air and dust evacuation duct which evacuates dust and particles from the broaching tool 3. The air blown on the broaching edges 31 suitably pulsates for improved cleaning of the broaching edges 31.

The front edge portions 31' and the side edge 31" portions of the broaching edges 31 are concave in order to increase the stability during the cutting operation and at the same time ensure secure removal of the waste material so that no, or very little burr is formed.

Figure 6:
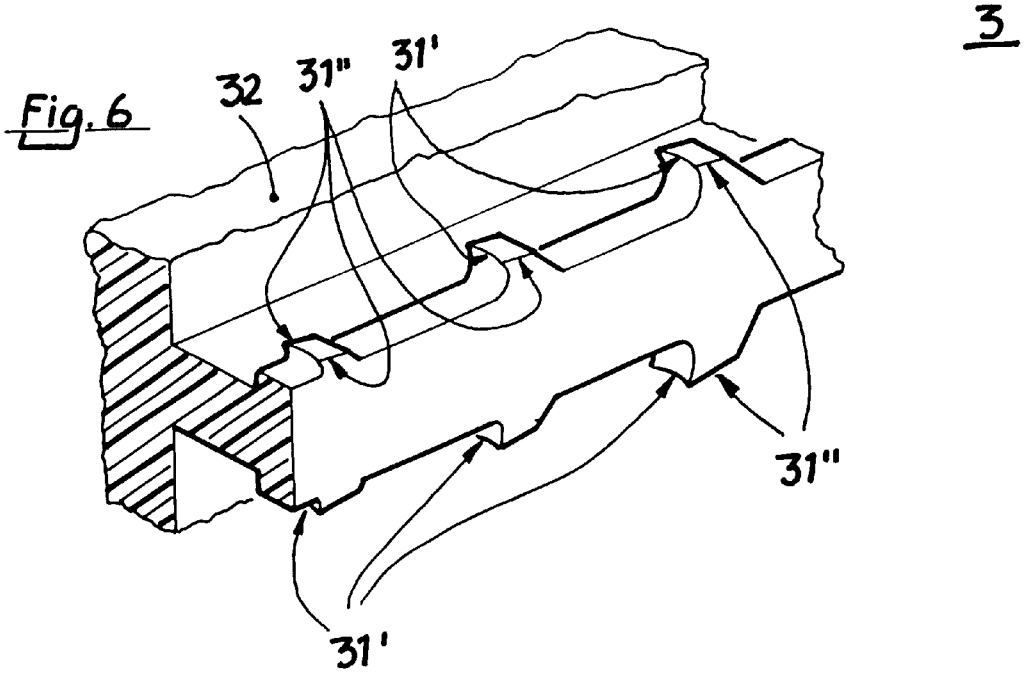
FIG. 6 shows, in cross-section perspective view, a broaching tool 3 for fine moulding undercuts 20 in a groove 2".

FIG. 6 shows, in cross-section perspective view, a broaching tool 3 for fine moulding undercuts 20 in a groove 2". The broaching tool 3 shown in FIG. 6 is a simplified version of the broaching tool 3 used to achieve the profile 2 cross-sections shown in FIGS. 1*d* and 3*d* above. The broaching tool 3 is used for fine moulding the groove 2" so that undercuts 20 and a good matching of a tongue 2', manufactured according to the present invention, are achieved. The broaching is initiated after having milled a substantial part of the groove 2" so that most of the material to be removed in order to obtain a groove 2" as shown in selected embodiments of the invention, is removed by the milling process ensuring a more secure operation in the broaching stage. The broaching tool 3 is adjustably fixed in the conveying machine, which machine feeds the board past the broaching tool 3.

The broaching tool 3 comprises broaching edges 31, a broaching body 32 and a broaching clamp. The broaching body 32 is provided with internal cooling channels for a cooling media. The cooling media may be gas and a liquid. A temperature sensor used for guiding the cooling broaching body 32 is advantageously also used. The manufacturing tolerances will be better if the temperature in the broaching tool 3 is maintained within a selected range. The temperature sensor may be an infrared sensor directed towards one or more broaching edges 31 or a conductive sensor attached to the broaching body 32 itself. It also possible to achieve a narrow temperature range in the broaching tool 3 by controlling the temperature of the cooling media. The broaching tool 3 may also be provided with one or more nozzles blowing air on the broaching edges 31. The air stream is adjusted so that it will cool the broaching edges 31 as well as removing dust and particles from the same. The broaching tool 3 may furthermore be provided with an air and dust evacuation duct which evacuates dust and particles from the broaching tool 3. The air blown on the broaching edges 31 suitably pulsates for improved cleaning of the broaching edges 31.

The front edge portions 31' and the side edge 31" portions of the broaching edges 31 are concave in order to increase the stability during the cutting operation and at the same time ensure secure removal of the waste material so that no, or very little burr is formed.

The invention is not limited by the embodiments shown since it can be varied in different ways within the scope of the invention. It for example possible to moulding a substantial part of the profile 2 by milling followed by fine moulding by broaching without an intermediate impregnation or coating as shown in selected embodiments of the invention. It is also possible to apply impregnation or coating at later stages of the process.

We claim:

1. A process for the manufacturing of longitudinal profiles comprising:
    a) moulding a substantial part of the profile cross-section by means of milling with a milling tool, and
    b) fine moulding undercuts in at least the groove of the board by means of broaching utilising at least one broaching tool.

2. A process according to claim 1 wherein the milling tool is adjustably fixed in a conveying machine, which machine feeds the boards past the milling tool during the milling operation.

3. A process according to claim 2 wherein the broaching tool is adjustably fixed in the conveying machine, which machine feeds the board past the broaching tool.

4. A process according to claim 1 wherein the process further comprises the step coating of the milled profile section before the fine moulding by broaching.

5. A process according to claim 4 wherein the coating process comprises applying wax or oil.

6. A process according to claim 4 wherein the coating process comprises applying a polymeric material.

7. A process according to claim 4 wherein the coating process comprises applying a lacquer.

8. A process according to claim 1, wherein the broaching tool comprises broaching edges, a broaching body and a broaching clamp.

9. A process according to claim 8 wherein the broaching body is provided with internal cooling channels for a cooling media, the cooling media being selected from the group consisting of a gas and a liquid.

10. A process according to claim 9 wherein the broaching body is provided with a temperature sensor.

11. A process according to claim 10 wherein the temperature sensor is an infrared sensor directed towards one or more broaching edges.

12. A process according to claim 10 wherein the temperature sensor is a conductive sensor attached to the broaching body.

13. A process according to claim 8 wherein the broaching tool is provided with at least one nozzle for blowing air on the broaching edges.

14. A process according to claim 8 wherein the broaching tool is provided with an air and dust evacuation duct which evacuates dust and particles from the broaching edges.

15. A process according to claim 13 wherein the broaching tool further is provided with an air and dust evacuation duct which evacuates dust and particles from the broaching edges.

16. A process according to claim 13 further comprising cleaning the broaching edged by pulsating air on the broaching edges.

17. A process according to claim 8 wherein the front edge portions of the broaching edges are concave.

18. A process according to claim 8 wherein the side edge portions of the broaching edges are concave.

19. A process according to claim 6 wherein the polymeric material comprises a thermoplastic polyolefin.

20. A process according to claim 7 wherein the lacquer comprises a a UV-curing lacquer.

* * * * *